W. E. KELLY.
BORING OR REAMING TOOL.
APPLICATION FILED JAN. 10, 1918.
1,306,185.
Patented June 10, 1919.
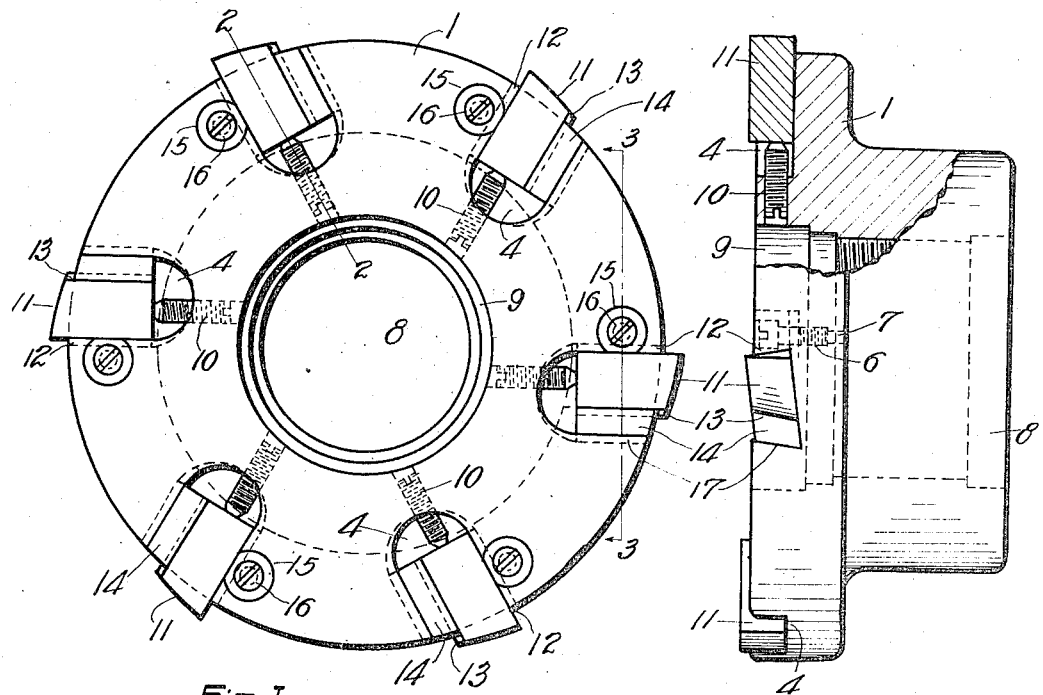
Fig. I
Fig. II
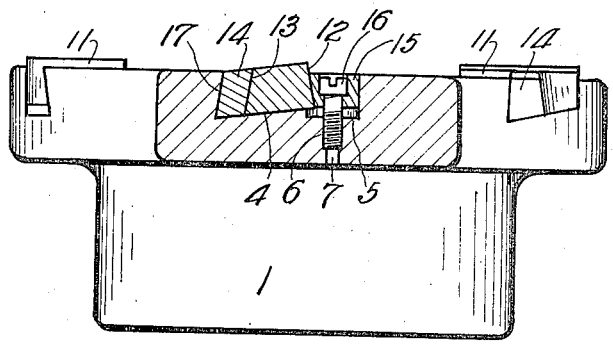
Fig. III
Inventor:
William E. Kelly.
C. J. Heinkel Atty.

UNITED STATES PATENT OFFICE.

WILLIAM E. KELLY, OF CLEVELAND, OHIO.

BORING OR REAMING TOOL.

1,306,185.             Specification of Letters Patent.      Patented June 10, 1919.

Application filed January 10, 1918. Serial No. 211,170.

*To all whom it may concern:*

Be it known that I, WILLIAM E. KELLY, a citizen of the United States, residing at Cleveland, in the county of Cuyahoga and State of Ohio, have invented a new and useful Boring or Reaming Tool, of which the following is a specification.

My invention relates to boring or reaming tools in which the cutters are inserted in a body of comparatively cheap material and are so placed and arranged that the heat produced by the operation of the cutters is easily radiated and that the cutters have better backing and produce more work than heretofore.

The object of my invention is to provide a tool which will produce, comparatively, more work than heretofore, will "stand up" longer, and do its work more satisfactorily.

In boring or reaming tools it is essential that the heat produced by the cut be carried off in some manner to prevent damage to the cutting edge of the cutters. Rectangular cutters have been used in the usual construction of boring or reaming tools, but the long side of such cutters were placed longitudinally of the tool body or parallel with the longitudinal axis of the tool. In the construction embodied in this invention, the long side of such rectangular cutters is placed transversely to the longitudinal axis of the tool, whereby a better backing is provided for the cutters and whereby the heat produced by the operation of the cutters is carried off more readily than heretofore. In tools of the class referred to, the cutting edge of the cutters usually fails by reason of the heat produced by the cut and by insufficient backing of the cutters. A cutter of rectangular cross section which is set into a body with the long side of the rectangle parallel with the longitudinal axis of the tool, has a tendency to heat more rapidly than a rectangular cutter set into a body with the long side of the rectangle transversely to the longitudinal axis of the tool as shown in the present invention. Therefore, this invention aims to eliminate excessive heat at the cutting edges, to provide better backing for the cutters, and to provide adjustment for the cutters. With these arrangements, the body may be made of cheap material and a comparatively small quantity of high-priced steel needs to be used for the cutters.

Although various arrangements and designs of tools which embody the spirit of the present invention may be devised, it is thought sufficient, for a full understanding of the present invention, to illustrate the same by one embodiment only which is shown in the accompanying drawings in which Figure I is a general front end view of a boring and reaming tool. Fig. II is a general side view, partly broken away on line 2—2 (Fig. I) to show method of adjustment and Fig. III is a section on line 3—3 showing method of holding the cutters in position in the body.

Similar reference characters refer to similar parts throughout the several views.

Referring now particularly to the drawings in which one embodiment of the present invention is shown:

The body 1 has the slots 4 which have beveled sides as shown. It will be seen that these slots 4 are cut into the end face of the body 1 and the flat bottom thereof is disposed at an angle with the aforesaid end face of the body 1. This is for the purpose of providing cutting clearance on the front of the cutter and eliminating the expense of grinding such cutter clearance if the bottom of the slots 4 were parallel with the said front end.

It will further be seen that the forward side of each slot forms a right angle with the bottom thereof while the rearward side is inclined therewith. By the above arrangement, one face only of the cutters needs to be beveled, but the square faces thereof will act as beveled faces and tend to firmly hold the cutters to their seats.

Adjacent to the slots 4 and in proper relation thereto, the openings 5 are provided in the body 1. Concentrically with these openings 5, the body 1 is provided with the threaded openings 6 and the openings 7, the purposes thereof will appear hereinafter.

The body 1 further has the opening 8 which is adapted to receive an arbor, or the nose of a spindle, or other suitable means of holding or supporting the tool. This opening 8 terminates in the counterbore 9 at the front face of the body 1 for the purpose of facilitating the manipulation of the adjusting screws which are for the purpose of adjusting the cutters 11.

The cutters 11 are properly hardened and have the beveled faces 13 and the faces 12 which latter form a right angle with the flat sides of the cutters. The faces 12 fit to the forward side of the slots 4 while the faces 13 fit to the beveled sides of the shoes 14, hereinafter described.

The openings 5 have the bushings 15 which are beveled on one side to suit the bevel on the faces 12 of the cutters 11 and which bushings 15 are adapted to be forced into the openings 5 by means of the screws 16 whereby the cutters 11 are held in position rigidly as clearly seen in Fig. III. The openings 7 are provided through the body 1 for the purpose of entering therethrough with a drift or other tool and release the bushings 15 in case they stick in the openings 5.

The shoes 14 have beveled edges to fit to the beveled edges 13 of the cutters 11 on one side and to the beveled sides 17 of the slots 4 on the other side, and extend substantially to the full length of the cutters 11. These shoes 14 are provided to form a lining for one side of the slots 4 so that the shoes 14 only and not the whole and more expensive body 1 needs to be replaced when worn by the action of the cutters 11.

In the present instance, the cutters 11 are shown adjustable, but it is thought obvious that they need not have adjustment, in which case the slots 4 may have a square bottom or some other means may be provided to form an abutment for the bottom of the cutters 11.

The general assembly and operation of the several elements shown and described is as follows:

The cutters 11, being properly machined, hardened and otherwise prepared are inserted into the slots 4 as shown; the bushings 15, and screws 16, also properly machined and prepared are inserted into their respective openings; the shoes 14, also properly machined and prepared, are inserted into the slots 4, and adjacent to the cutters 11 as shown; and the adjusting screws 10 are inserted into their respective openings; all of the above being clearly shown in the drawings. After the tool as a whole is properly assembled, the cutters 11 may be adjusted by releasing the bushings 15 by means of the screws 16, by manipulating the adjusting screws 10 to locate the cutters 11 in their desired position and by then tightening the screws 16 whereby the bushings 15 will be forced inwardly and, due to the beveled surfaces on these bushings 15, the cutters 11 will be forced against the shoes 14 whereby the cutters 11 will be securely locked in the desired position.

It is thought that the foregoing description and illustration of the particular tool selected for the purpose of pointing out my invention, is sufficiently clear to fully show the same and enable others to devise other combination of elements to accomplish my aim of providing a tool of the character described which supports the cutters in a more substantial manner than heretofore, which provides for a better than heretofore disposal of the heat produced by the operation of the cutters, which is inexpensive of repairs and which produces better results than heretofore.

Therefore, without limiting myself to the precise construction shown and described, I claim:

1. In a tool of the character described, the combination of a body which is provided with slots the bottoms and rear sides of which are inclined to the end face of the body, a cutter in each of said slots, the forward edge of each of said cutters being at right angles with the outer face thereof, and clamping means operating against the said forward edge of said cutters.

2. In a tool of the character described, the combination of a body which is provided with slots the bottoms and rear sides of which are inclined to the end face of the body, a cutter in each of said slots, the forward edge of each of said cutters being at right angles with the outer face thereof, clamping means operating against the said forward edge of said cutters, and adjusting means for said cutters.

3. In a tool of the character described, the combination of a body which is provided with slots the bottoms and rear sides of which are inclined to the end face of the body, a cutter in each of said slots, the forward edge of each of said cutters being at right angles with the outer face thereof, a shoe in each of said slots adjacent to said cutters to take up the wear on said rear sides of said slots, and clamping means operating against the said forward edge of said cutters to press the same against said shoes.

4. In a tool of the character described, the combination of a body which is provided with slots the bottoms and rear sides of which are inclined to the end face of the body, a cutter in each of said slots, the forward edge of each of said cutters being at right angles with the outer face thereof, a shoe in each of said slots adjacent to said cutters to take up the wear on said rear sides of said slots, clamping means operating against the said forward edge of said cutters to press the same against said shoes, and adjusting means for said cutters.

WILLIAM E. KELLY.